US00RE41986E

(19) United States
(12) Reissued Patent
Rexford et al.

(10) Patent Number: US RE41,986 E
(45) Date of Reissued Patent: Dec. 7, 2010

(54) METHOD AND APPARATUS FOR LOAD-SENSITIVE ROUTING OF LONG-LIVED PACKET FLOWS

(75) Inventors: Jennifer Lynn Rexford, Princeton, NJ (US); Anees Shaikh, Yorktown Heights, NY (US)

(73) Assignee: AT&T Intellectual Property II, L.P., Reno, NV (US)

(21) Appl. No.: 11/541,518

(22) Filed: Sep. 29, 2006

Related U.S. Patent Documents

Reissue of:
(64) Patent No.: 6,801,502
Issued: Oct. 5, 2004
Appl. No.: 09/566,561
Filed: May 8, 2000

U.S. Applications:
(60) Provisional application No. 60/133,095, filed on May 7, 1999.

(51) Int. Cl.
*H04L 12/28* (2006.01)
*H04L 12/56* (2006.01)
*H04J 3/16* (2006.01)
*H04J 3/22* (2006.01)

(52) U.S. Cl. ..... 370/389; 370/465; 370/235; 370/254; 709/239

(58) Field of Classification Search ..... 370/229, 370/235, 237, 389, 400–401, 409, 465, 468
See application file for complete search history.

(56) References Cited

U.S. PATENT DOCUMENTS

| | | | | | |
|---|---|---|---|---|---|
| 5,280,470 | A | * | 1/1994 | Buhrke et al. | 370/232 |
| 5,307,465 | A | | 4/1994 | Iki | |
| 5,764,645 | A | | 6/1998 | Bernet et al. | |
| 5,848,055 | A | * | 12/1998 | Fedyk et al. | 370/228 |
| 5,884,047 | A | | 3/1999 | Aikawa et al. | |
| 5,903,559 | A | * | 5/1999 | Acharya et al. | 370/355 |
| 6,097,718 | A | | 8/2000 | Bion | |
| 6,112,248 | A | | 8/2000 | Maciel et al. | |
| 6,137,781 | A | | 10/2000 | Goto et al. | |
| 6,201,794 | B1 | | 3/2001 | Stewart et al. | |
| 6,215,772 | B1 | * | 4/2001 | Verma | 370/236 |
| 6,937,574 | B1 | * | 8/2005 | Delaney et al. | 370/254 |
| 2004/0196787 | A1 | * | 10/2004 | Wang et al. | 370/229 |
| 2006/0007946 | A1 | * | 1/2006 | Kastenholz et al. | 370/401 |

* cited by examiner

*Primary Examiner*—Kevin C Harper

(57) ABSTRACT

The present invention builds on the implications of variability in flow durations on the stability of load-sensitive routing. In accordance with an embodiment of the present invention, long-lived flows of packets are routed dynamically while short-lived flows are forwarded on preprovisioned static paths. This hybrid approach can exploit flow-classification hardware at the edge of backbone networks and known techniques for flow-pinning, as well as basic insights from earlier work on QoS routing. This approach of separating short-lived and long-lived flows can dramatically improve the stability of dynamic routing.

16 Claims, 4 Drawing Sheets

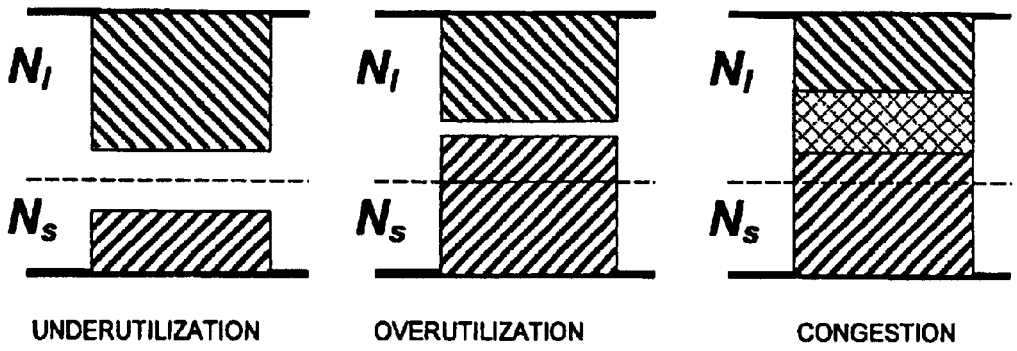

Figure 4

| Parameter | Definition |
|---|---|
| FLOW TRIGGER | Minimum bytes, packets or seconds before dynamic routing (e.g., 10 packets) |
| FLOW TIMEOUT | Maximum idle period before terminating a flow (e.g., 60 seconds) |
| FLOW AGGREGATION | Level of address aggregation (e.g., port, host, subnet, or net) |
| UPDATE PERIOD | Maximum time between link-state updates (e.g., 90 seconds) |
| HOLD-DOWN TIMER | Minimum time between link-state updates (e.g., 5 seconds) |
| LINK-STATE TIMER | Minimum proportional change in link state (e.g., 30% change) |
| PATH THRESHOLD | Minimum number of hops beyond a shortest path (e.g., 2 hops) |
| CAPACITY PARTITION | Proportion of link capacity allocated to long-lived flows (e.g., 55%) |

Figure 5

METHOD AND APPARATUS FOR LOAD-SENSITIVE ROUTING OF LONG-LIVED PACKET FLOWS

Matter enclosed in heavy brackets [ ] appears in the original patent but forms no part of this reissue specification; matter printed in italics indicates the additions made by reissue.

CROSS REFERENCE TO RELATED APPLICATIONS

This application claims priority to Provisional Application Serial No. 60/1 33,095, filed on May 7, 1999, the content of which is incorporated by reference herein.

FIELD OF THE INVENTION

The present invention relates generally to routing in a packet-switched network. More particularly, the present invention relates to dynamic load-sensitive routing for traffic engineering of packet-switched networks.

BACKGROUND OF THE INVENTION

Traffic engineering of large packet-switched networks, such as an Internet Protocol (IP) backbone network, has become a critical issue in recent years, due to the unparalleled growth of the Internet and the increasing demand for predictable communication performance. Ideally, an Internet service provider (OSP) optimizes the utilization of network resources by provisioning backbone routes based on the load between the edge routers. However, the volume of traffic between particular points in the network can fluctuate widely over time, due to variations in user demand and changes in the network configuration, including failures or reconfigurations in the networks of other service providers. Currently, network providers must resort to coarse timescale measurements to detect network performance problems, or may even depend on complaints from their customers to realize that the network requires reconfigurations. Detection may be followed by a lengthy diagnosis process to discover what caused the shift in traffic. Finally, providers must manually adjust the network configuration, typically redirecting traffic by altering the underlying routes.

The above traffic engineering challenges have spurred renewed interest in dynamic routing as a network-management tool—not just as a method for providing quality-of-service (QoS) guarantees. Most backbone networks today still employ static routing (e.g., based on routing protocols such as OSPF and IS—IS), and, depending on the network topology and the path-selection algorithm, static routing often cannot select good paths for all source-destination pairs. For example, protocols such as OSPF and IS—IS always forward packets on shortest paths, based on static link weights. As such, they cannot exploit non-minimal routes, and typically have limited control of how traffic is distributed when a source-destination pair has multiple shortest-path routes. Proposed extensions to OSPF and IS—IS support more flexible tie-breaking based on link load, without addressing the other limitations of static shortest paths. With newer routing protocols such as MPLS, network administrators can preconfigure explicit tagged routes between specific source-destination pairs, providing greater control and flexibility in balancing network load for particular traffic patterns. Moving one step farther, dynamic routing can potentially circumvent network congestion and balance link load on a smaller time scale by reacting to current traffic demands. This motivation has been the basis of constraint-based routing in MPLS (see e.g. D. O. Awduche et al., "Requirements for Traffic Engineering over MPLS," IETF RFC 2702 (September 1999) and the proposed QoS extensions to OSPF (see e.g. G. Apostolopoulos et al., "QoS routing mechanisms and OSPF extensions," IETF RFC 2676 August 1999), as well as the ATM Forum's PNNI protocol (see e.g. PNNI Specification Working Group, Private Network-Network Interface Specification Version 1.0, ATM Forum, March 1996).

By selecting paths that circumvent congested links, dynamic routing can balance network load and improve application performance. Early attempts in the ARPANET to route based on dynamic link metrics resulted in dramatic fluctuations in link load over time. Routing packets based on out-of-date link-state information caused "flapping", where a large amount of traffic would travel to seemingly under-utilized links. These links would become overloaded, causing future packets to route to a different set of links, which would then become overloaded. Improvements in the definition of the link metrics reduced the likelihood of oscillations, but designing stable schemes for load-sensitive routing is fundamentally difficult in packet-based networks like the Internet. With the evolution toward integrated services in IP networks, recent research focused on load-sensitive routing of "flows" or "connections", instead of individual packets. For example, a flow could correspond to a single TCP or UDP session, all IP traffic between a particular source-destination pair, or even coarser levels of aggregation. In particular, several QoS- routing schemes were proposed that select paths based on network load, as well as application traffic characteristics and performance requirements. As set forth above, several QoS-routing protocols have been proposed in recent years for both IP and ATM networks. Dynamic routing of flows should be more stable than selecting paths at the packet level, since the load on each link should fluctuate more slowly, relative to the time between updates of link-state information. Also, defining network load in terms of reserved bandwidth and buffer space, rather than measured utilization, should enhance stability.

Despite the potential benefits of dynamic routing, its deployment remains uncertain due largely to the significant bandwidth and processing requirements imposed by link-state update propagation, route computation, and signaling. Most proposed QoS-routing protocols follow a source-directed link-state approach in which the source router computes paths based on its current view of network resource availability (i.e., its link-state database) and the resource requirements of the flow. Once a path is selected, the router initiates hop-by-hop signaling toward the destination. Each router performs an admission test and reserves resources on behalf of the flow. If one or more of the links cannot support the additional traffic, the flow is "blocked", and perhaps retried later with a different resource request. Once established, the path is typically pinned for the duration of the flow (in the absence of link failure), even if new, better paths become available. Link-state updates may be distributed periodically, or triggered when the link-state metric changes by some threshold. Triggered updates are typically coupled with a hold-down timer to impose a minimum time between updates to avoid overloading the network with updates during intervals of rapid fluctuation. For example, the update period, trigger threshold, and hold-down timer could be 90 seconds, 40%, and 30 seconds, respectively. Tuning the frequency of link-state update messages introduces an important tension between overhead and performance, and has been the focus of several recent studies on QoS routing. With reliable flooding of link-state update messages, every router receives a copy of every update on every incoming link. This introduces substantial bandwidth and processing overheads in large backbone networks. Each router must maintain its own view of the available link resources, distribute link-state information to other routers, and compute and establish routes for new flows. Since most TCP/UDP transfers consist of just a handful of packets, load-sensitive routing of IP flows would require frequent propagation of link-state metrics and recomputation of routes to avoid the same instability problems that arise in dynamic routing at the packet level. Thus, despite the potential benefits of dynamic routing, it is understandable why most backbone networks still employ static routing rather than dynamic routing techniques.

Accordingly, there is a need for a new routing scheme that maintains the benefits of dynamic routing, while also making it both stable and efficient.

SUMMARY OF THE INVENTION

The present invention exploits the variability of packet flow durations to avoid the undesirable effects of traditional approaches to dynamic routing. While most flows on the Internet are short-lived, the majority of the packets and bytes belong to long-lived flows, and this property persists across several levels of aggregation. Although this inherent variability of Internet traffic sometimes complicates the provisioning of network bandwidth and buffer resources, heavy-tailed flow-size distributions can be exploited to reduce the overheads of certain control mechanisms. Most notably, variability in flow duration has been the basis of several known techniques that reduce router forwarding overheads by establishing hardware switching paths for long-lived flows. These schemes classify arriving packets into flows and apply a trigger (e.g., arrival of some number of packets within a certain time interval) to detect long-lived flows. Then, the router dynamically establishes a shortcut connection that carries the remaining packets of the flow. The shortcut terminates if no packets arrive during a predetermined timeout period (e.g., 60 seconds). Several measurement-based studies have demonstrated that it is possible to limit the setup rate and the number of simultaneous shortcut connections, while forwarding a large fraction of packets on shortcuts.

The present invention builds on the implications of variability in flow durations on the stability of load-sensitive routing. In accordance with an embodiment of the present invention, long-lived flows of packets are routed dynamically while short-lived flows are forwarded on preprovisioned static paths. This hybrid approach can exploit flow-classification hardware at the edge of backbone networks and known techniques for flow-pinning, as well as basic insights from earlier work on QoS routing. This approach of separating short-lived and long-lived flows can dramatically improve the stability of dynamic routing. In accordance with another embodiment of the present invention, the detection of long-lived flows can be related to the timescale of link-state update messages, thereby allowing the present invention to react to fluctuations in network load without introducing route flapping. In accordance with another embodiment of the present invention, simple and robust rules for allocating network resources for short-lived and long-lived flows are disclosed, as well as techniques for sharing excess link capacity between the two traffic classes, The provisioning rules can be tailored to measurements of the distribution of flow sizes, and the triggering policy for detecting long-lived flows.

The present invention has the advantage of reducing the overhead of load-sensitive routing in a number of critical ways. It has the advantage of fewer signaling operations. Limiting load-sensitive routing to long-lived traffic substantially reduces the number of signaling operations for pinning routes, while still carrying the majority of packets and bytes on dynamically-selected paths.

The present invention also has the advantage of fewer link-state update messages. Dynamic routing of long-lived flows reduces the frequency of link-state update messages, both by reducing the number of flows that are dynamically routed, and by dramatically increasing the average flow duration.

The present invention also has the advantage of requiring fewer route computations. The slower changes in link-state information permit the routers to execute the path-selection algorithm less often without significantly degrading the quality of the routes. The routers can exploit efficient techniques for path precomputation rather than computing paths at flow arrival.

In addition, recent measurement studies suggest that long-lived flows have a less bursty arrival process than short-lived flows. Hence, focusing on long-lived flows should reduce the variability in the protocol and computational demands of dynamic routing, and lower the likelihood that a large number of flows route to the same links before new link-state metrics are available.

These and other advantages of the invention will be apparent to those of ordinary skill in the art by reference to the following detailed description and the accompanying drawings.

BRIEF DESCRIPTION OF THE DRAWINGS

FIG. 4 is a diagram illustrating the dynamic sharing of link bandwidth between long-lived and short-lived flows.

FIG. 5 is a table summarizing various parameters affecting load-sensitive routing of long-lived flows.

DETAILED DESCRIPTION

Figure 1:
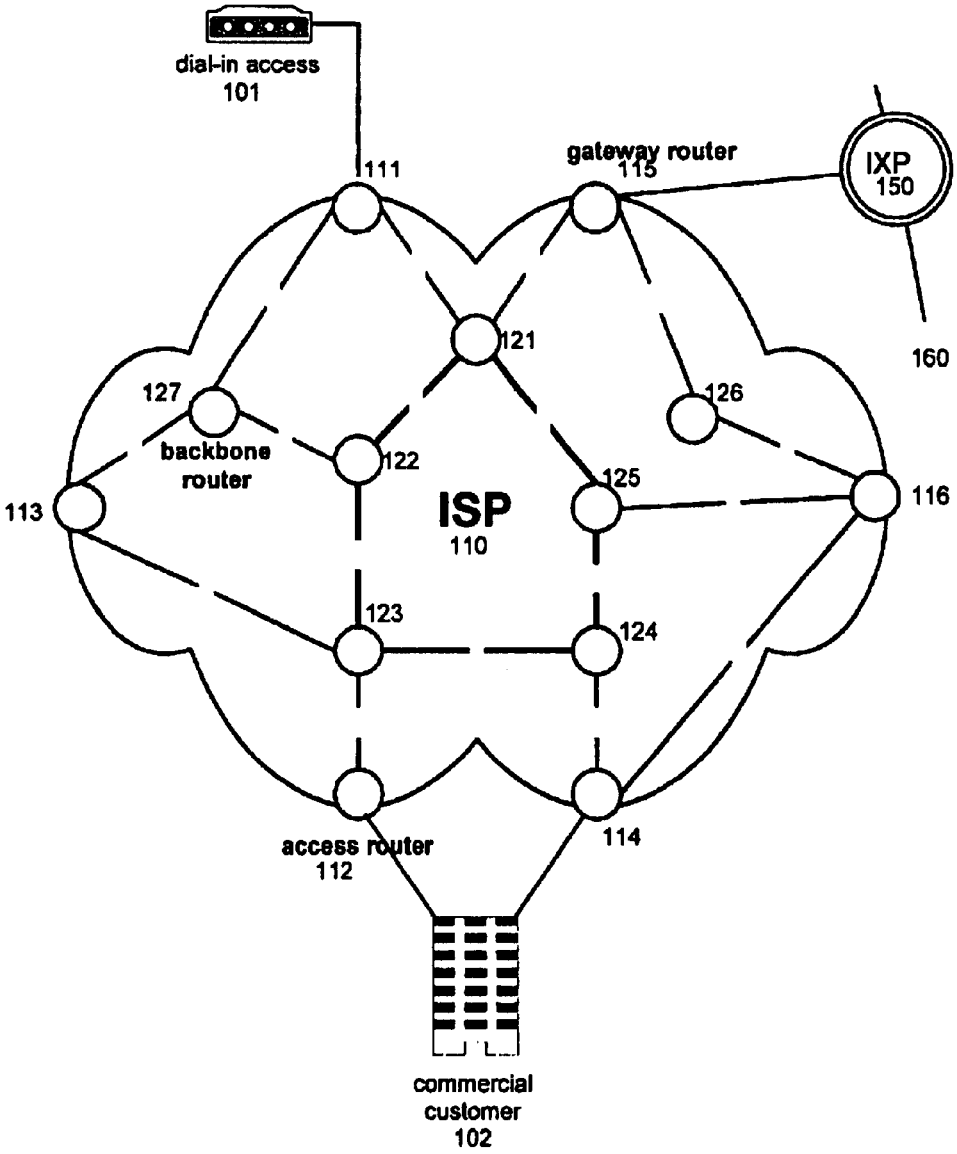
FIG. 1 is a simplified diagram of a packet-switched network illustrating a preferred embodiment of the present invention.

FIG. 1 sets forth a simplified diagram of a packet-switched network suitable for illustrating preferred embodiments of the present invention. The network 110 comprises a number of linked routers 111 to 127. Individuals, e.g. 101, and commercial customers, e.g. 102, are able to access the network 110 via access routers, e.g. 111, 112, and 114. Gateway router 115 connects this particular domain with other network domains through an interexchange point (IXP) 150 using well-known interdomain protocols. Routing of packets inside the domain, in the prior art, would be handled by an intradomain protocol such as OSPF (Open Shortest Path First), a link-state protocol in which routers precompute routing tables based on link "cost" information received from neighboring routers. See, e.g. Moy, "OSPF Version 2", IETF Network Working Group, RFC 2178, July 1997, which is incorporated by reference herein.

In accordance with a preferred embodiment of the present invention, flows of packets continue to be routed on static default paths, as in the prior art, until the flow can be characterized by the network as being "long-lived." The detection of long-lived flows is discussed in detail in Section 1 below.

Such long-lived traffic flows are routed using any of a number of different load-sensitive routing techniques, as further described below in Section 2, while the remaining "short-lived" traffic flows on static preprovisioned paths. It is advantageous to detect the long-lived flows at edge routers in the network. For example, assume that a static path has been preprovisioned that links edge router 113 to router 116 through routers 123 and 124 in FIG. 1. The edge router 131 classifies packets into flows and triggers a dynamic route computation when a long-lived flow is detected. The network proceeds to "pin" a dynamic path along routers 127, 122, and 121 along which the long-lived flow is forwarded. After the flow of packets diminishes, the dynamic route may be "unpinned" and the packets again forwarded along the default path.

Exploiting the potential gains of the present invention requires careful consideration of how long-lived traffic interacts with the many short-lived flows in the network. In particular, the transient load fluctuations of the short-lived traffic should not affect the stability of the dynamic routing of the long-lived flows. It is advantageous to logically partition the link resources between the two traffic classes, resulting in a logical division of the traffic into $N_{short}$ and $N_{long}$. That is, each link has capacity $C_s$ and $c_l$ for $N_{short}$ and $N_{long}$, respectively, for a total link capacity of $c_s$ and $c_l$. FIG. 4 illustrates the way link capacity is shared between short and long flows. Long-lived flows are dynamically routed based on the utilization $u_l \in [0; C_l]$ of the link resources on $N_{long}$. In addition, the routing algorithm used for long-lived flows preferably should favor paths that enhance the performance of the short-lived flows in the other partition. The division of link capacity into $c_s$ and $c_l$ is based on the distribution $f$ flow size, where $f(x)$ is the likelihood that a flow consists of no more than x bytes. The probability distribution is known in advance, based on network traffic measurements, and changes much more slowly than the offered load in the network.

The interaction between short-lived and long-lived flows depends on how link-state metrics are defined. For a practical deployment of load-sensitive routing, link-state updates should not occur much more frequently than under traditional static routing protocols. Otherwise, the network provider would have to limit the number of routers and links in individual areas or peer groups, which would significantly limit the advantages of load-sensitive routing. However, routing based on out-of-date information also severely degrades the effectiveness of load-sensitive routing. Increasing the update period or trigger threshold reduces the link-state update frequency but results in out-of-date information which can cause substantial route flapping and induce a router to select a suboptimal or even infeasible path. Under high update periods, flows typically block during the signaling phase, due to out-of-date information about the load on downstream links. This introduces additional setup overhead in the network for flows that are ultimately blocked. It is possible to reduce flapping by selecting amongst a set of several paths, or by using coarse-grained link metrics to increase the likelihood of "ties" among similar paths. Such techniques avoid the problem of targeting the one "best" path, but merely extend the range of link-state update periods under which conventional load-sensitive routing performs well. Ultimately, flapping arises when the timescale of the arriving and departing traffic is small relative to the link-state updates. Previous studies have also shown that high-bandwidth flows and bursty flow arrivals cause even larger fluctuations in link state, requiring more frequent update messages.

Earlier approaches to dynamic routing in packet networks operated on measured quantities, such as average utilization, queue length, or delay. These measured quantities can fluctuate on a fairly small timescale, due to the variability of Internet traffic, and are very sensitive to the selection of the estimation interval. In contrast, the present invention defines link state in terms of allocated resources on each link, which should result in a more stable quantity that changes on the timescale of flow arrival and departure. In fact, separating routing for long-lived traffic may improve the stability of measured quantities like link utilization and queue length, allowing the use of such metrics in path selection.

The link state could conceivably reflect the resources consumed by both the short-lived and long-lived flows. This model is appropriate in an integrated services network that initiates signaling for all flows. However, explicitly allocating resources for each of the many short-lived flows would introduce significant overheads. In addition, the burstiness in the arrivals of short-lived flows would increase the variability of the link-state metric. Instead, it is advantageous to define link state in terms of the resources allocated to the long-lived delays.

In basing link state only on the dynamically-routed traffic, this embodiment of the present invention runs the risk of directing long-lived flows to links that already carry a significant amount of statically-routed short-lived traffic. To prevent this situation, it is preferable to not permit dynamically-routed flows to be allocated the entire capacity of the link. The proportion of link resources that can be allocated for short-lived flows can be tailored to the proportion of traffic carried by these flows, as described above. For example, suppose a link has a capacity C. Then, this embodiment of the present invention allows long-lived flows to reserve some portion $c_l \leqq C$ of these resources. At any time t, these dynamically-routed flows have been allocated some portion $u_l(t) \leqq c_l$ of these resources. Despite the logical partitioning of network resources, it is advantageous that the short-lived flows be able to consume excess capacity when the long-lived partition is underutilized. This approach is well-suited to best-effort and adaptive Internet applications, which can exploit additional bandwidth when it is available, and reduce the sending rate when the resources are constrained. The allocation of bandwidth $c_l$ exists only to control routing, and need not dictate the link scheduling policies. In fact, the short-lived and long-lived flows could each select from a variety of link-scheduling and buffer-management techniques, such as class-based queuing and weighted Random Early Detection, to differentiate between flows with different performance requirements. For example, a router could direct all incoming traffic receiving assured service to a single queue, irrespective of whether a packet belongs to a short-lived or long-lived flow. The router need not provide per-flow scheduling or buffer management for long-lived flows, though a particular implementation could employ per-flow mechanisms to further improve performance. But, these router mechanisms are not necessary to exploit the traffic engineering benefits of the present invention.

The following three sections describe preferred policies for flow detection, path selection, and network provisioning.

1. Detecting Long Flows and Pinning Routes

Figure 2:
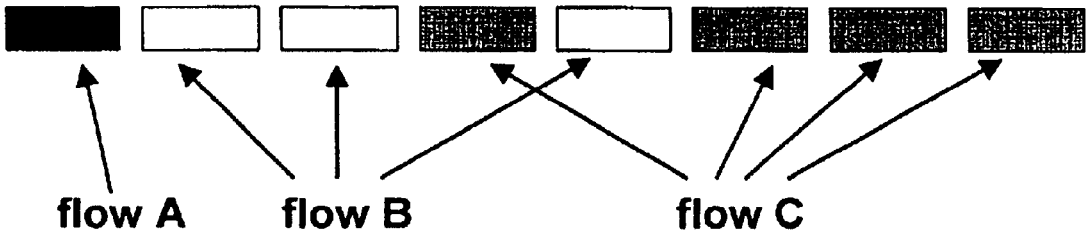
FIG. 2 is a diagram of flows of packets in the network.

The present invention requires an effective way for the network to classify flows and to initiate selection of a dynamic route for the long-lived traffic. In accordance with a preferred embodiment of the present invention, the network nodes at the edge of the network can be high-speed routers employing flow classification hardware/software to associate each packet with a flow. For example, two high speed packet classification designs suitable for use with the present invention are described in V. Srinivasan et al., "Fast and Scalable Layer Four Switching," in Proceedings of ACM SIGCOMM, September 1998, and T. Lakshman et al., "High-Speed Policy-Based Packet Forwarding Using Efficient Multi-Dimensional Range Matching," in Proceedings of ACM SIGCOMM, September 1998, which are incorporated by reference herein. FIG. 2 sets forth an abstract diagram of a series of packets travelling through the network. Related packets are shown grouped into three flows. The router classifier can group the packets in accordance with any of a number of flow definitions: e.g. by TCP/UDP port, by host, by subnet, by net aggregation, based on TOS bits, etc. The router can also keep track of the number of bytes or packets that have arrived on each flow, or the length of time that the flow has been active. The router thereby can apply some form of flow timeout to determine the end of the flow.

Figure 3:
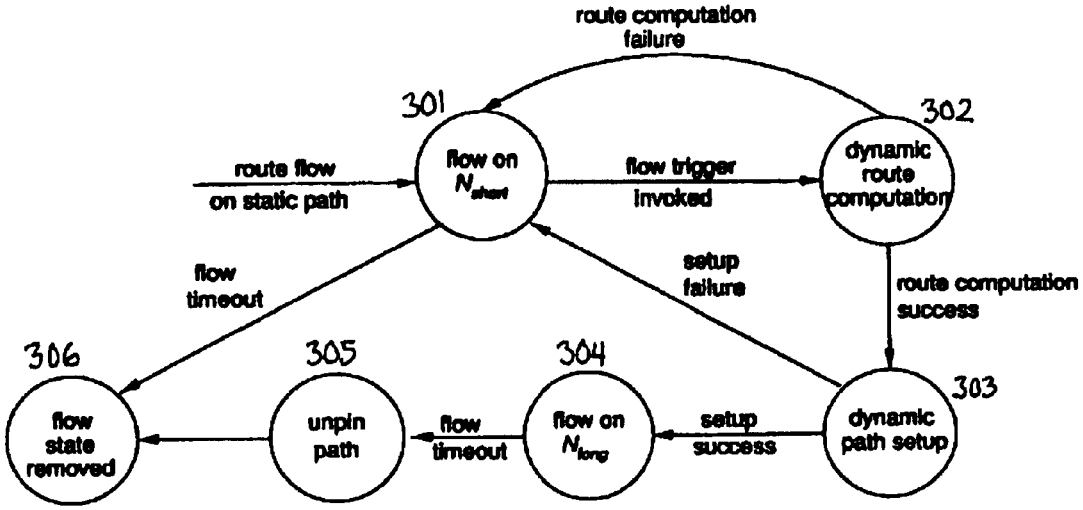
FIG. 3 is a flow state machine illustrating the steps of detecting and routing flows, in accordance with a preferred embodiment of the present invention.

FIG. 3 summarizes in the form of a flow state machine the steps of detecting and routing flows, adapted in accordance with a preferred embodiment of the present invention. By default, at 301, the router forwards arriving packets on the path(s) selected by the static intra-domain routing policy. For example, in OSPF, the router would forward the incoming packet to an outgoing link along a shortest-path route, based on static link weights. Then, once the accumulated size or duration of the flow has exceeded some threshold (in terms of bytes, packets, or seconds), at 302 the router selects a dynamic route for the remaining packets in the flow. Section 2 describes in further detail the manner in which the dynamic path may be computed. If the route computation fails, then the router continues to route the flow on the static path. If the route computation succeeds, the router proceeds to set up the dynamic path at 303. If the dynamic path setup succeeds, then the router forwards the flow via the dynamic path at 304. The flow classifier continues to track the arriving packets, and signals the termination of the dynamic route after the timeout period expires at 305 and 306.

In accordance with one embodiment of the present invention, the dynamic route could be established by creating a label-switched path in MPLS, which populates the forwarding tables in the routers along the flow's new path. In this scenario, the edge router selects an explicit route and signals the path through the network, as in a traditional application of MPLS. If the network consists of ATM switches, the dynamic route would involve path selection and connection signaling similar in spirit to MPOA. The selected route could be cached or placed in a routing table, to ensure that future packets are forwarded along the selected route, until the flow timeout is reached. The dynamic path can be selected based on the router's current view $u'_l$ of the load on the long-lived partition of each link, as well as the resources b requested for the flow. Since the router may have out-of-date link-state information, the value of $u'_l$ may differ from the actual load $u_l$. The resource requirement b for each flow could be included in the flow classifier at the edge router (e.g., the parameters of the flow conditioner under differentiated services). Alternatively, the value of b could be implicitly associated with other parameters in the classifier, such as the port numbers or IP addresses (e.g., dedicating a fixed bandwidth to Web transfers, or to the set of users with IP addresses in the range assigned to a modem bank).

Dynamic routing of long-lived flows draws on link-state metrics $u_l$ that represent the reserved resources on each link. Link-state advertisements can be flooded throughout the network, as in QOSPF and PNNI, or may be piggybacked on the messages used for the default intradomain routing protocol. The present invention focuses on link bandwidth as the primary network resource, since application throughput is a critical performance issue. Although network load may be characterized by several other dynamic parameters, including delay and loss, initial deployments of load-sensitive routing are likely to focus on a single simple metric to reduce algorithmic complexity. In addition, bandwidth is an additive metric, which simplifies the computation of the link-state metric and ensures that the core routers need only store aggregate information about the resource requirements of the set of flows on each link (e.g., upon arrival of a long-lived flow, the router could update $u_l=u_l+b$). The value of b could represent the peak, average, or effective bandwidth of the flow. Since any of the short-lived or long-lived flows can consume excess link capacity, inaccuracies in estimating the resource requirements of any particular flow need not waste network bandwidth.

2. Selecting Paths for Long-Lived Flows

There are a number of known load-sensitive routing algorithms that could be used for path selection of long-lived flows. See, e.g., S. Chen and K. Nahrstedt, "An Overview of Quality of Service Routing for Next-Generation High-Speed Networks: Problems and Solutions," IEEE Network Magazine, pp. 64–79, November/December 1998. For example, path selection can be implemented efficiently using a variant of the Dijkstra shortest-path algorithm or the Bellman-Ford algorithm, with relatively simple extensions to support precomputation of the path(s) to each destination. See R. Guerin, et al., "QoS Routing Mechanisms and OSPF Extensions," in Proc. Global Internet Miniconference, November 1997, which is incorporated by reference herein. When dynamically routing a long-lived flow, the edge router can prune links that do not appear to satisfy the bandwidth requirement of the flow (i.e., $u'_l+b > c_l$). After selecting the path, the flow undergoes hop-by-hop signaling to reserve the bandwidth on each link. In the meantime, the flow's packets continue to travel on the default static path. Upon receiving a signaling message, a core router tests that the link can actually support the additional traffic (i.e., $u_l+b \leqq c_l$) and updates the link state upon accepting the flow; these resources are released up on flow termination. If any of the links in the path is unable to support the additional traffic (i.e., $u_l+b>c_l$), the flow may be blocked and forced to remain on the static path. Note that, in contrast to research on QoS routing, the present invention does not reject a blocked flow, but instead continues to forward the flow's packets on the static path. Another dynamic routing operation may be performed after the flow trigger is reached again. As an alternate policy, the flow could be accepted on a dynamically-routed path, even though the resources on the dynamic path are temporarily over-allocated.

With effective provisioning of the long-lived partition, encountering an over-constrained link should be an unlikely event. Once the flow has been accepted, the remaining packets are forwarded along the new path. Still, only a subset of the long-lived lived flows are active at any moment, and others may not consume their entire allocated bandwidth across time. In particular, no bandwidth is consumed during the flow timeout period, which could be as large as 60 seconds. The presence of inactive flows can be handled by allocating a smaller amount of bandwidth for each individual flow. F or example, suppose that measurement of the flow-size distribution f(x) show that flows on the long-lived partition have an average residual lifetime of $l_l$ seconds. Then, each flow could be allocated a bandwidth b that is a proportion $l_l/(l_l+60)$ of its estimated resource requirement. In addition, the short-lived flows can capitalize on transient periods of excess capacity ($u_l<c_l$), making the present scheme robust to inaccuracies in estimating the aggregate bandwidth requirements of the long-lived flows.

It is preferable that the chosen dynamic algorithm favor short paths to avoid consuming extra resources in the network. Long routes make it difficult to select feasible paths for subsequent long-lived flows, and also consume excess bandwidth that would otherwise be available to the short-lived traffic. Out-of-date link-state information exacerbates this problem, since stale link metrics may cause a flow to follow a non-minimal path even when a feasible shortest path exists. To further benefit the short-lived flows, the long-lived flows can be routed on paths that have the most unreserved capacity on the long-lived partition. In other words, amongst a set of routes of equal length, the algorithm can select the widest path. If the widest, shortest path cannot support the bandwidth of the new flow, the algorithm can consider routes up to some h>0 hops longer than the shortest path. By reducing the effects of stale link-state information, the present routing scheme should permit the use of higher values of h than an approach that performs dynamic routing of all flows.

3. Provisioning Resources for Short-Lived and Long-Lived Flows

The effectiveness of the hybrid routing policy depends on how the network resources are allocated between the short-lived and long-lived flows. In the simplest case, the network could allow dynamically-routed traffic to be allocated the entire capacity C on a link. Since path-selection favors paths with more available bandwidth, the long-lived flows would not typically consume an excessive amount of resources on any one link. However, if a link carries a large amount of short-lived traffic, dynamically routing additional traffic to this link would increase the congestion, particularly under non-uniform traffic. To avoid unexpected congestion, the routing protocol should be aware of the expected load that the statically-routed traffic introduces on each link. The network can preallocate these resources by limiting long-lived flows to some portion $c_l$ of the link capacity C. A larger value of $c_l$ provides greater flexibility to the long-lived flows, while a smaller value of $c_l$ devotes more resources to the statically-routed traffic. Despite the advantages of allocating resources for short-lived flows, selecting $c_l$ too small would increase the likelihood of "blocking" of dynamically-routed long-lived flows. Such blocking would, in turn, increase the resources consumed by statically-routed traffic to carry the "blocked" long-lived flows. In experiments conducted by the inventors, the effectiveness of the present technique is not sensitive to the selection of a large value for $c_l$, since excess short-lived traffic can exploit underutilized resources that were allocated for long-lived flows.

Fortunately, although the traffic load may vary across time, the distribution of the number of packets and bytes in a flow is relatively stable, particularly on the timescale of dynamic path selection; hence, the flow-size distribution can be determined in advance, based on network traffic measurements. It should be noted, though, that the flow-size distribution may not be the same on every link. For example, the distribution of flow sizes for an access link to a video server would differ from the distribution near a DNS server. These links would arguably devote different proportions of resources to short and long-lived flows. In the core of the network, the mixing of traffic from a variety of applications and source-destination pairs should result in relatively similar flow-size distributions across different links. The simplest provisioning model divides link bandwidth in proportion to the amount of traffic slated for each partition. As an example, consider the distribution $f(x)$ of the number of packets in a flow. Suppose a flow is dynamically routed after T packets have arrived. That is, a proportion f (T) of the flows are short-lived. Let $l_s$ and $l_l$ be the average number of packets in the short-lived flows (i.e., flows less than T packets long) and the long-lived flows, respectively. These averages can be derived directly from f(x).

All of the traffic in the short-lived flows, and the first T packets of each long-lived flow, travel on static preprovisioned shortest paths. In the absence of blocking, the remainder of the traffic in the long-lived flows travels on dynamic routes. This suggests that $c_l$ should be a fraction $$\frac{(1-f(T))(t_4-T)}{f(T)t_2+(1-f(T))t_1}$$

of the link capacity C. The value of T should be large enough to control the fluctuations in the link-state metrics for the dynamically-routed traffic, yet small enough to ensure that a large amount of traffic can be dynamically routed. In addition, if T is very large, the capacity $c_l$ dedicated to long-lived flows may not be large relative to the flow bandwidth b; this would introduce additional blocking on long-lived flows due to bandwidth fragmentation. Fortunately, the heavy-tailed flow-size distribution f(x) ensures that $c_l$ is at least half of the link capacity, even for large flow triggers T. Bandwidth fragmentation should not be a problem for reasonable flow trigger values.

A preferred embodiment of the present invention has a number of tunable parameters that affect the network dynamics, which are summarized in FIG. 5. It should be noted that the cost performance tradeoffs of the present invention relate directly to the selection of the flow trigger. Despite the advantages of large flow triggers in reducing the computational overheads, a smaller flow trigger ensures that more traffic can be routed based on load, at the risk of greater sensitivity to stale link-state information. The flow trigger should be chosen such that most flows on $N_{long}$ have a residual lifetime that is large relative to the link-state update period. When the update period is small (e.g., 30 seconds), choosing small flow triggers that assign more traffic to dynamic routes improves performance. To maximize the hybrid approach's ability to react to shifts in traffic load, the flow trigger advantageously should be made as small as possible, subject to the link state period and the target route computation rate.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. For example, the detailed description discloses the present invention in particular with reference to the Internet and protocols relevant to the Internet. However, the principles of the present invention could be extended to other types of networks and other protocols. Such an extension could be readily implemented by one of ordinary skill in the art given the above disclosure.

What is claimed is:

1. A method of routing packets in a packet-switched network comprising the steps of:

establishing a static route for packets in the packet-switched network;

classifying a first group of packets as a long-lived flow; [and]

establishing a load-sensitive route for the long-lived flow, *and*

[wherein] *initially routing* flows of long-lived packets [are initially routed] over the static route and [continue to be routed] *continuing to route the flows of long-lived packets* over the static route if a load-sensitive route with adequate capacity cannot be established,

*wherein the establishing a load-sensitive route includes using a dynamic routing algorithm to identify the load-sensitive route,*

*and wherein the dynamic routing algorithm identifies individual links to comprise the load-sensitive route based at least on the amount of the bandwidth of those links that has already been allocated to long-lived flows.*

2. A method of routing packets in a packet-switched network comprising the steps of:

establishing a static route for packets in the packet-switched network;

classifying a first group of packets as a long-lived flow; [and]

establishing a load-sensitive route for the long-lived flow, *and*

*routing the long-lived flow over the load-sensitive route,* wherein the load-sensitive route is established by creating a label-switched path in MPLS,

*wherein the establishing a load-sensitive route includes using a dynamic routing algorithm to identify the load-sensitive route,*

*and wherein the dynamic routing algorithm identifies individual links to comprise the load-sensitive route based at least on the amount of the bandwidth of those links that has already been allocated to long-lived flows.*

3. A router for a packet-switched network comprising:

a plurality of interfaces to other routers in the packet-switched network for receiving and forwarding packets;

packet classifying means for classifying groups of received packets as a long-lived flow; and routing means for computing and forwarding packets along a static route; and for computing and forwarding long-lived flows of packets along a load-sensitive route, wherein flows of long-lived packets are initially routed over the static route and continue to be routed over the static route if a load-sensitive route with adequate capacity cannot be established,

*wherein the computing and forwarding long-lived flows includes using a dynamic routing algorithm to identify the load-sensitive route,*

*and wherein the dynamic routing algorithm identifies individual links to comprise the load-sensitive route based at least on the amount of the bandwidth of those links that has already been allocated to long-lived flows.*

4. A router for a packet-switched network comprising:

a plurality of interfaces to other routers in the packet-switched network for receiving and forwarding packets;

packet classifying means for classifying groups of received packets as a long-lived flow; and;

routing means for computing and forwarding packets along a static route; and for computing and forwarding long-lived flows of packets along a load-sensitive route, wherein the load-sensitive route is established by creating a label-switched path in MPLS,

*wherein the computing and forwarding long-lived flows includes using a dynamic routing algorithm to identify the load-sensitive route,*

*and wherein the dynamic routing algorithm identifies individual links to comprise the load-sensitive route based at least on the amount of the bandwidth of those links that has already been allocated to long-lived flows.*

5. A *non-transitory* computer readable medium containing executable program instructions for performing a method on a router connected to a packet-switched network comprising the steps of:

establishing a static route for packets in the packet-switched network;

classifying a first group of packets as a long-lived flow; and establishing a load-sensitive route for the long-lived flow;

wherein flows of long-lived packets are initially routed over the static route and continue to be routed over the static route if a load-sensitive route with adequate capacity cannot be established,

*wherein the establishing a load-sensitive route includes using a dynamic routing algorithm to identify the load-sensitive route,*

*and wherein the dynamic routing algorithm identifies individual links to comprise the load-sensitive route based at least on the amount of the bandwidth of those links that has already been allocated to long-lived flows.*

6. A *non-transitory* computer readable medium containing executable program instructions for performing a method on a router connected to a packet-switched network comprising the steps of:

establishing a static route for packets in the packet-switched network;

classifying a first group of packets as a long-lived flow; and establishing a load-sensitive route for the long-lived flow;

wherein the load-sensitive route is established by creating a label-switched path in MPLS,

*wherein the establishing a load-sensitive route includes using a dynamic routing algorithm to identify the load-sensitive route,*

*and wherein the dynamic routing algorithm identifies individual links to comprise the load-sensitive route based at least on the amount of the bandwidth of those links that has already been allocated to long-lived flows.*

7. A method of routing packets in a packet-switched network comprising:

establishing a static path in the packet-switched network;

identifying a group of packets belonging to a long-lived flow, where the long-lived flow was initially routed over the static path; and responsive to the identifying, routing the long-lived flow over a second path in the packet-switched network that is different from the static path;

wherein the routing includes using a dynamic routing algorithm to identify the second path;

and wherein the dynamic routing algorithm identifies individual links to comprise the second path based at least on the amount of the bandwidth of those links that has already been allocated to long-lived flows.

8. The method of claim 7 wherein one or more links in the packet network each has a portion of its bandwidth partitioned for long-lived flows.

9. A method of routing packets in a packet-switched network comprising:

establishing a static path in the packet-switched network;

identifying a group of packets belonging to a long-lived flow, where the long-lived flow was initially routed over the static path; and responsive to the identifying, routing the long-lived flow over a second path in the packet-switched network that is different from the static path;

wherein one or more links in the packet network each has a portion of its bandwidth partitioned for long-lived flows;

and wherein the dynamic routing algorithm identifies individual links to comprise the second path based at least on the amount of the bandwidth of those links partitioned for long-lived flows that has already been allocated.

10. The method of claim 9 wherein the dynamic routing algorithm identifies as individual links to comprise the second path only links that can accommodate the long-lived flow within the partitioned portion.

11. A method of routing packets in a packet-switched network comprising:

establishing a static path in the packet-switched network;

identifying a group of packets belonging to a long-lived flow, where the long-lived flow was initially routed over the static path; and responsive to the identifying, routing the long-lived flow over a second path in the packet-switched network that is different from the static path;

wherein the routing includes using a dynamic routing algorithm to identify the second path;

and wherein the dynamic routing algorithm identifies the second path based on link states of links in the packet-switched network wherein the link state of each of at least ones of the links in the packet-switched network is a function of the amount of resources that have been allocated to long-lived flows on that link.

12. A method of routing packets in a packet-switched network comprising:

establishing a static path in the packet-switched network;

identifying a group of packets belonging to a long-lived flow, where the long-lived flow was initially routed over the static path; and thereafter routing the identified long-lived flow over a path computed using a dynamic routing algorithm if the algorithm is successful in computing a path that meets at least one dynamic routing criterion, but otherwise continuing to route the identified long-lived flow over the static path;

wherein one or more links in the packet network each have a portion of their bandwidths partitioned for long-lived flows;

and wherein the dynamic routing algorithm identifies individual links to comprise the second path based at least on the amount of the bandwidth of those links partitioned for long-lived flows that has already been allocated.

13. A method of routing packets in a packet-switched network comprising:

establishing a static path in the packet-switched network;

identifying a group of packets belonging to a long-lived flow, where the long-lived flow was initially routed over the static path; and thereafter routing the identified long-lived flow over a path computed using a dynamic routing algorithm if the algorithm is successful in computing a path that meets at least one dynamic routing criterion, but otherwise continuing to route the identified long-lived flow over the static path;

wherein the dynamic routing algorithm identifies the second path based on link states of links in the packet-switched network, and wherein the link state of each of at least ones of the links in the packet-switched network is a function of the amount of resources that have been allocated to long-lived flows on that link.

14. A router for a packet-switched network, the router being adapted to establish a static path in the packet-switched network;

identify a group of packets belonging to a long-lived flow, where the long-lived flow was initially routed over the static path; and responsive to the identifying, route the long-lived flow over a second path in the packet-switched network that is different from the static path;

wherein the router uses a dynamic routing algorithm to identify the second path, and wherein the dynamic routing algorithm identifies individual links to comprise the second path based at least on the amount of the bandwidth of those links that has already been allocated to long-lived flows.

15. A non-transitory computer readable medium containing executable program instructions that, when executed, perform the method comprising establishing a static path in the packet-switched network;

identifying a group of packets belonging to a long-lived flow, where the long-lived flow was initially routed over the static path; and thereafter routing the identified long-lived flow over a path computed using a dynamic routing algorithm if the algorithm is successful in computing a path that meets at least one dynamic routing criterion, but otherwise continuing to route the identified long-lived flow over the static path;

wherein one or more links in the packet network each have a portion of their bandwidths partitioned for long-lived flows and wherein the dynamic routing algorithm identifies individual links to comprise the second path based at least on the amount of the bandwidth of those links partitioned for long-lived flows that has already been allocated.

*16. A non-transitory computer readable medium containing executable program instructions that, when executed, perform the method comprising*

*establishing a static path in the packet-switched network;*

*identifying a group of packets belonging to a long-lived flow, where the long-lived flow was initially routed over the static path; and*

*thereafter routing the identified long-lived flow over a path computed using a dynamic routing algorithm if the algorithm is successful in computing a path that meets at least one dynamic routing criterion, but otherwise continuing to route the identified long-lived flow over the static path;*

*wherein the dynamic routing algorithm identifies the second path based on link states of links in the packet-switched network, and wherein the link state of each of at least ones of the links in the packet-switched network is a function of the amount of resources that have been allocated to long-lived flows on that link.*

* * * * *